(No Model.)
T. J. McMURRAY.
SULKY.
No. 497,596. Patented May 16, 1893.
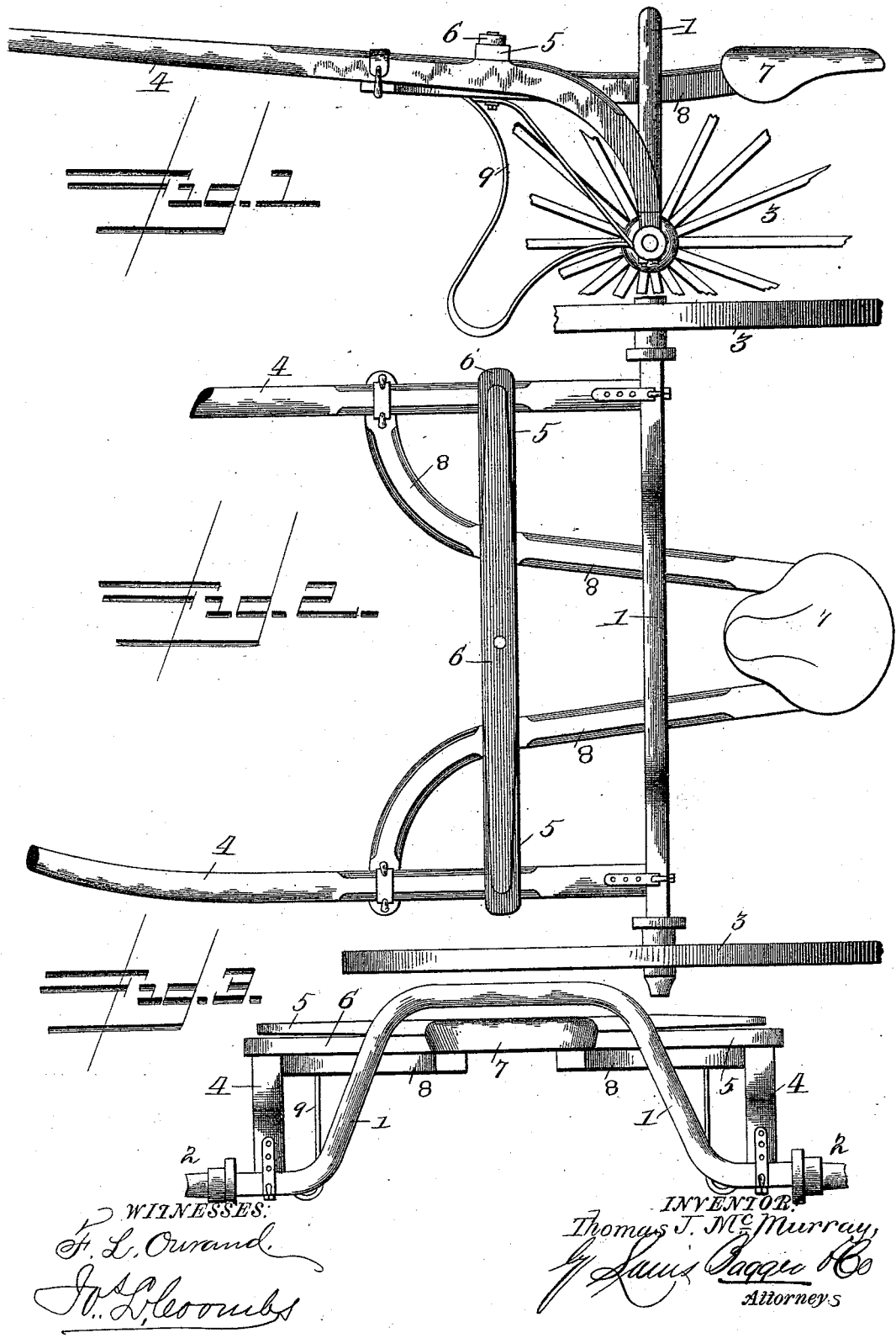

UNITED STATES PATENT OFFICE.

THOMAS J. McMURRAY, OF MARION, OHIO.

SULKY.

SPECIFICATION forming part of Letters Patent No. 497,596, dated May 16, 1893.

Application filed December 17, 1892. Serial No. 455,519. (No model.)

*To all whom it may concern:*

Be it known that I, THOMAS J. MCMURRAY, a citizen of the United States, and a resident of Marion, in the county of Marion and State of Ohio, have invented certain new and useful Improvements in Sulkies; and I do hereby declare that the following is a full, clear, and exact description of the invention, which will enable others skilled in the art to which it appertains to make and use the same, reference being had to the accompanying drawings, which form a part of this specification.

My invention relates to improvements in sulkies or road wagons, such as are usually employed for speeding, breaking, gaiting and training purposes. In this class of vehicles as hitherto constructed, the driver's seat has been located in front of and above the axle which is objectionable in many respects.

The object of my invention is to provide an improved construction of these vehicles whereby I secure important and superior advantages, and it consists essentially in locating the seat in rear of and below the axle as will hereinafter be fully described and specifically pointed out in the claims.

In the accompanying drawings—Figure 1 is a side view of a sulky constructed in accordance with my invention, the near wheel being removed. Fig. 2 is a plan view of the same. Fig. 3 is an end view, the wheels being removed.

In the said drawings the reference numeral 1 denotes a curved axle provided with spindles 2, upon which the wheels 3 are mounted as usual.

To the axle are secured the shafts 4 in the ordinary manner, said shafts being connected a short distance in front of the axle by a transverse bar 5, to which bar the singletree 6 is pivoted.

The numeral 7 denotes the driver's seat, which is preferably made in the form or shape of a saddle, which is secured to the rearwardly extending curved or diagonal risers 8, clipped at their front ends to the shafts and also to the cross bar 5 intermediate of their ends. These risers extend beyond and underneath of the axle, but are entirely disconnected therefrom. Secured to the cross bar 5 near each end is a bent metal rod 9, which extends downwardly a short distance, forming a stirrup for the driver's feet.

By suspending the seat in rear of and below the axle, as above set forth, the driver is enabled at all times to observe the motion of the horse's feet and the horse can be closely hitched without any danger of injury in case of rearing or kicking. The driver is also enabled to throw his feet to the ground at any instant, thereby freeing himself from the cart or sulky.

Having thus described my invention, what I claim is—

1. In a sulky or road cart the combination with the curved axle, the shafts secured thereto and the transverse bar connected with said shafts, of the risers extending rearwardly beyond the axle, and the seat secured to the risers and located below the axle, substantially as and for the purpose specified.

2. In a sulky or road cart the combination with the curved axle, the shafts secured thereto and the transverse bar connected with the shafts, of the risers provided with a seat extending rearwardly beyond and located underneath the axle, substantially as described.

3. In a sulky or road cart, the combination with the curved axle, the shafts secured thereto and the transverse bar connected with the shafts, of diagonal or curved risers clipped to the shafts and transverse bar, and extending rearwardly beyond and underneath the axle, the seat secured to the rear ends of the risers, and the stirrups, substantially as described.

In testimony that I claim the foregoing as my own invention I have hereunto affixed my signature in presence of two witnesses.

THOMAS J. McMURRAY.

Witnesses:
GEORGE B. SCOFIELD,
R. C. PERRY.